United States Patent

Rüegg

[11] 4,054,406
[45] Oct. 18, 1977

[54] HYDRAULIC EJECTOR OPERATING MECHANISM

[75] Inventor: Edwin Rüegg, Netstal, Switzerland

[73] Assignee: Maschinenfabrik und Giesserei Netstal AG, Switzerland

[21] Appl. No.: 686,260

[22] Filed: May 13, 1976

Related U.S. Application Data

[63] Continuation of Ser. No. 547,500, Feb. 6, 1975, abandoned, which is a continuation-in-part of Ser. No. 376,290, July 5, 1975, abandoned.

[51] Int. Cl.² ............................................. B29F 1/14
[52] U.S. Cl. ................................... 425/444; 425/436 R
[58] Field of Search ....... 425/436 R, 436 RM, 450 R, 425/444

[56] References Cited

U.S. PATENT DOCUMENTS 3,334,378  8/1967  Scherrerwiz et al. .............. 425/444

3,857,440  12/1974  Ruegg ........................... 425/450 R X

FOREIGN PATENT DOCUMENTS 2,022,161  12/1971  Germany ........................ 425/436 R Primary Examiner—Richard B. Lazarus
Assistant Examiner—W. R. Briggs
Attorney, Agent, or Firm—McGlew and Tuttle

[57] ABSTRACT

The ejector operating mechanism includes an ejector cylinder and an ejector piston, with the ejector piston extending through an adjusting bush and being fixedly connected thereto. An internally threaded sleeve is mounted in the cylinder for movement axially thereof while being fixed against rotation, and abutments engage with the sleeve to limit the axial movement thereof. The adjusting bush is threadedly engaged in this sleeve whereby the axial position of the sleeve relative to the bush can be varied by rotating the ejector piston, to determine the stroke of the ejector piston.

7 Claims, 1 Drawing Figure

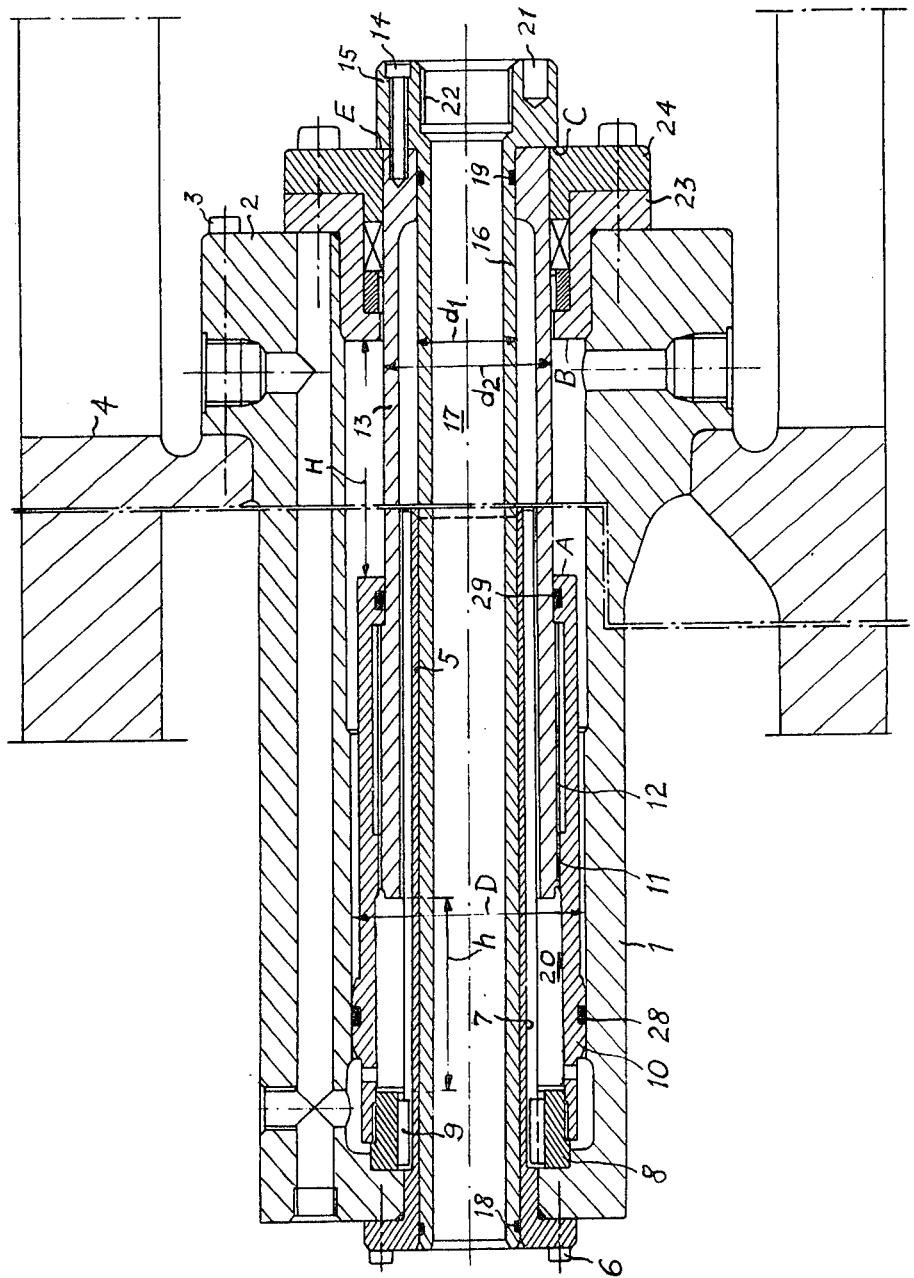

4,054,406

HYDRAULIC EJECTOR OPERATING MECHANISM

CROSS REFERENCE TO RELATED APPLICATION

This is a continuation of application Ser. No. 547,500 filed Feb. 6, 1975, now abandoned, which is a continuation-in-part of copending application Ser. No. 376,290, filed July 5, 1973, for "Hydraulic Ejector In Injection Molding Machines," now abandoned.

FIELD AND BACKGROUND OF THE INVENTION

This invention relates to hydraulic ejectors in an injection molding machine, particularly such a machine for processing plastics.

The ejectors of these machines must afford the possibility of adjusting the stroke thereof to the different lengths of the injection molding to be produced. Known arrangements all have the disadvantage that they are relatively long.

A typical arrangement of a hydraulic ejector mounted in the hollow piston of a hydraulic closing unit of a plastic injection molding machine is illustrated in applicant's U.S. Pat. No. 3,857,440, issued Dec. 31, 1974, and based on applicant's U.S. Pat. application Ser. No. 341,111, filed Mar. 14, 1973, for "Die Casting Machine."

SUMMARY OF THE INVENTION

The objective of the present invention is to provide a hydraulic injector in an operating mechanism, for use in an injection molding machine, and which has a minimum length while providing, in a simple manner, for the continuous adjustment of the ejection stroke between two given limits.

To this end, a hydraulic injector operating mechanism embodying the invention is characterized in that the ejector piston traverses an adjusting bush fixedly connected with it, and this bush has a male thread engaging a female thread of an axially movable sleeve which is secured against rotation in the cylinder. The axial position of the sleeve relative to the adjusting bush, which can be varied by rotating the ejector piston, determines the stroke of the ejector piston.

An object of the invention is to provide an improved hydraulic ejector operating mechanism for use in an injection molding machine.

Another object of the invention is to provide such a hydraulic ejector operating mechanism which has a minimum length.

A further object of the invention is to provide such a hydraulic ejector in which, in a simple manner, continuous adjustment of the ejection stroke between two given limits can be effected.

For an understanding of the principles of the invention, reference is made to the following description of a typical embodiment thereof as illustrated in the accompanying drawing.

BRIEF DESCRIPTION OF THE DRAWING

In the drawing, the single FIGURE is an axial sectional view through a hydraulic ejector operating mechanism embodying the invention as mounted in the hollow piston of the hydraulic closing unit of an injection molding machine.

DESCRIPTION OF THE PREFERRED EMBODIMENT

Referring to the drawing, a part of a hollow piston of a hydraulic closing unit of a plastic injection molding machine is indicated at 4. The cylinder 1 of the hydraulic ejector is secured in hollow piston 4 by means of screws 3 extending through a flange 2 on cylinder 1 and threaded into hollow piston 4. Screws 6 secure the end flange of a guide bush 5, extending coaxially into cylinder 1, to the left end of cylinder 1. Bush 5 is formed externally with two V-grooves 7 extending longitudinally thereof and in which are guided inner keys 9 of an insert ring 8 thus secured against rotation.

The mold closing and locking unit, of an injection molding machine, having the hollow piston 4 of the hydraulic closing unit may be identical with that shown in applicant's aforementioned U.S. Pat. No. 3,857,440, in which FIG. 1 illustrates a movable mold support 3 operable, as shown in FIG. 3 thereof, by a hollow piston 9 in which there is coaxially mounted an ejector designated 14 in the drawing of U.S. Pat. No. 3,857,440. The disclosure of U.S. Pat. No. 3,857,440 is specifically incorporated, by reference, in this application as a teaching to those skilled in the art of known arrangements of an ejector in an injection molding machine and in which the ejector is mounted coaxially within a tubular or hollow piston of a mold closing unit.

Insert ring 8 has male or external threads with which are threadedly engaged internal threads of a sleeve 10 which has, in a center part, internal or female threads 11 engaging the external or male threads 12 of an adjusting bush 13. An end of adjusting bush 13 projects from the right end of cylinder 1 and is secured, by means of screws 14, on the head 15 of ejector piston 16 which extends through adjusting bush 13 and guide bush 5. Gaskets 18 and 19 seal bush 13 relative to ejector piston 16, so that no pressure medium can escape from chamber 20 of cylinder 1. Corresponding gaskets 28 and 29 are provided between sleeve 10 and cylinder 1 and between sleeve 10 and adjusting bush 13, respectively.

Head 15 of ejector piston 16 is formed with a through bore 17, and also with a larger diameter threaded bore 22 into which can be threaded an intermediate piece, which has not been shown, which carries the ejector associated with the ejector piston. In addition, recesses 21 are provided in the free end face of piston head 15, and serve to receive an adjusting tool for rotating piston 16.

The piston head 15, whose inner end face C extends radially beyond adjusting bush 13, abuts the end face E of a stuffing box 24 arranged at the end of adjusting bush 13. In turn, stuffing box 24 engages a tapered sleeve 23 seated in cylinder 1. The inner end face B of sleeve 23 serves as a right hand stroke stop for the end face A of sleeve 10, while the outer end face E of stuffing box 24 serves as a left-hand stroke stop for end face C of piston head 15. By turning piston head 15, sleeve 10 and insert ring 8, which are secured against rotation by the grooves 7 and the keys 9, are displaced axially, so that the stroke H, between the end faces A and B, can be adjusted continually in the axial direction by the maximum amount $h$. In the drawing, the adjustable stroke is $H-h$.

The attainable ejection force is calculated from the operating pressure of the pressure medium in cylinder chamber 20 and the difference in the cross sectional areas at the diameters D and $d_1$, while the retracting force is calculated from the operating pressure multiplied by the difference of the cross sectional areas at the diameters D and $d_2$.

From the foregoing descripton, the operation and adjustment of the ejector operating mechanism should be readily apparent to one having even ordinary skill in the art of injection molding. To eject a molded piece from the mold, fluid pressure is admitted into the left end of cylinder 1 to act against the left end of the assembly including insert ring 8, sleeve 10 and adjusting bush 13. Thus, the ejector piston is moved to the right until the face A of sleeve 10 abuts the face B of taper sleeve 23. Similarly, to retract the ejector piston, fluid under pressure is admitted to the right end of the cylinder 1 to act against the sleeve 10 to retract the assembly including insert ring 8, sleeve 10 and adjusting bush 13. This movement to the left is limited by abutment of the end face C of piston head 15 against the outer end face E of stuffing box 24.

To adjust the stroke of the ejector operating mechanism, a suitable tool is inserted into the apertures 21 of piston head 15 and the latter is rotated so that adjusting bush 13 is threaded further into or further out of sleeve 10.

The described ejector operating mechanism permits not only a simple continuous adjustment of the ejection stroke, but it is also particularly compact and of small overall length, despite a relatively large maximum stroke.

While a specific embodiment of the invention has been shown and described in detail to illustrate the application of the principles of the invention, it will be understood that the invention may be embodied otherwise without departing from such principles.

What is claimed is:

1. In a hydraulic operating mechanism operably connected to a mold for ejecting a workpiece from a mold, including an ejector cylinder, the improvement comprising, in combination, an ejector piston movable axially of said cylinder; an externally threaded adjusting bush; said piston extending through said adjusting bush and being fixedly connected thereto; an internally threaded sleeve mounted in said cylinder for movement axially thereof; means fixing said internally threaded sleeve against rotation; and abutment means operable to limit axial movement of said sleeve; said adjusting bush being threadedly engaged in said sleeve, whereby the axial position of said sleeve relative to said adjusting bush can be varied by rotating said ejector piston to determine the stroke of said ejector piston.

2. The improvement claimed in claim 1, including a guide bush secured in said cylinder and telescopically engaging said ejector piston to serve as a guide for said ejector piston during axial movement of said ejector piston; a ring inserted into an end of said internally threaded sleeve and secured non-rotatably to said internally threaded sleeve; and keys engaged in said ring and in longitudinal grooves of said guide bush and securing said ring and said sleeve against rotation during conjoint axial displacement thereof.

3. The improvement claimed in claim 2, in which said insert ring has an end face engageable with the inner end of said adjusting bush to determine the maximum adjustment of the stroke of said ejector piston.

4. The improvement claimed in claim 3, in which said ejector piston is formed with an axial through bore; and gasket on the external surface of said ejector piston cooperating, rspectively, with said adjusting bush and said guide bush to assure tight sealing of the chamber of said cylinder.

5. In a hydraulic operating mechanism operably connected to a mold for ejecting a workpiece from a mold, including an ejector cylinder, the improvement comprising, in combination, an ejector piston movable axially of said cylinder; an externally threaded adjusting bush; said piston extending through said adjusting bush and being fixedly connected thereto; an internally threaded sleeve mounted in said cylinder for movement axially thereof; means fixing said internally threaded sleeve against rotation; abutment means operable to limit axial movement of said sleeve; said adjusting bush being threadedly engaged in said sleeve, whereby the axial position of said sleeve relative to said adjusting bush can be varied by rotating said ejector piston to determine the stroke of said ejector piston; and a stuffing box secured on said cylinder with the interposition of a taperes sleeve; said ejector piston having a diametrically enlarged head at an operating end; said stuffing box being engageable with said piston head to limit the stroke of said ejector piston in one direction, and said tapered sleeve being engageable with said internally threaded sleeve to limit the stroke of the ejector piston in the opposite direction.

6. The improvement claimed in claim 5, in which the external surface of said piston head is provided with formations to receive a tool for rotary adjustment of said ejector piston to adjust the stroke thereof.

7. The improvement claimed in claim 5, in which said piston head is formed with an internally threaded bore having a diameter larger than that of its through bore to receive a connecting element for the hydraulic ejector.

* * * * *